US006041396A

United States Patent [19]
Widigen

[11] Patent Number: 6,041,396
[45] Date of Patent: Mar. 21, 2000

[54] SEGMENT DESCRIPTOR CACHE ADDRESSED BY PART OF THE PHYSICAL ADDRESS OF THE DESIRED DESCRIPTOR

[75] Inventor: Larry Widigen, Salinas, Calif.

[73] Assignee: Advanced Micro Devices, Inc., Sunnyvale, Calif.

[21] Appl. No.: 08/615,912

[22] Filed: Mar. 14, 1996

[51] Int. Cl.[7] .................................................. G06F 12/08
[52] U.S. Cl. .......................... 711/206; 711/208; 711/209; 711/202; 711/163
[58] Field of Search ..................................... 395/416, 490, 395/418, 419, 421.1, 406, 402; 711/3, 202, 203, 206, 208, 218, 219

[56] References Cited

U.S. PATENT DOCUMENTS

| | | | |
|---|---|---|---|
| 4,442,484 | 4/1984 | Childs et al. ............................. | 395/490 |
| 5,144,551 | 9/1992 | Cepulis ..................................... | 395/490 |
| 5,321,836 | 6/1994 | Crawford et al. ....................... | 395/416 |
| 5,361,340 | 11/1994 | Kelly et al. ................................ | 711/3 |

FOREIGN PATENT DOCUMENTS

| | | | |
|---|---|---|---|
| 2260629 | 4/1993 | United Kingdom ........................ | 12/8 |
| 2260629A | 4/1993 | United Kingdom . | |
| 2260630 | 4/1993 | United Kingdom ........................ | 12/8 |

*Primary Examiner*—Eddie P. Chan
*Assistant Examiner*—Than V. Nguyen
*Attorney, Agent, or Firm*—Townsend and Townsend and Crew LLP

[57] ABSTRACT

A structure for, and a method of operating, a descriptor cache to store segment descriptors retrieved from memory. In one embodiment, the descriptor cache is direct-mapped and addressed by a first part of the physical address in memory at which a desired descriptor is stored. If the desired descriptor is not stored in the addressed entry of the descriptor cache then the descriptor is retrieved from a descriptor table held in memory and loaded into the addressed entry of the descriptor cache (which will then be able to satisfy future requests for the same descriptor). At the same time, a second part of the descriptor's physical address is loaded into an entry of a physical address cache corresponding to the addressed entry of the descriptor cache. Whenever a write to the memory occurs, the physical address cache receives the physical address written into and compares the contents of the entry of the physical address cache addressed by the first part of the physical address with the second part of the physical address. If a match occurs, the corresponding entry of the descriptor cache is modified to indicate invalidity. In this way, coherence between the descriptor tables held in memory (which may be modified) and the descriptor cache is maintained.

24 Claims, 7 Drawing Sheets

SEGMENT DESCRIPTOR CACHE ADDRESSED BY PART OF THE PHYSICAL ADDRESS OF THE DESIRED DESCRIPTOR

BACKGROUND OF THE INVENTION

The present invention relates generally to computer memory management and more specifically to techniques for caching segment descriptors.

The memory management (virtual memory) system of a computer is responsible for translating the virtual (logical) addresses viewed by the programmer to the physical addresses used to reference main memory (hereinafter referred to as "memory"). This specification will focus on aspects of the memory management system of the industry standard x86 processor architecture. However, it will be apparent to one of ordinary skill in the art that the invention disclosed herein is applicable to other processor architectures involving retrieval of segment descriptors from memory.

Translation of virtual addresses to physical addresses in the x86 memory management scheme involves both segmentation and paging. Segmentation is the process by which virtual addresses are mapped to intermediate addresses. Paging is the process by which intermediate addresses are mapped to physical addresses. Except for degenerate cases, the intermediate address will be different from the original virtual address. Similarly, except when paging is disabled, the physical address will be different from the associated intermediate address. When paging is disabled, the intermediate and physical addresses are identical.

Segmentation

The x86 Architecture encourages the division of programs into modules referred to as segments. There can be many segments. In essence, the segment is its own address space. Intra-segment addressing can be oblivious to the fact that the segment is not necessarily located at the bottom of the intermediate address space. Within a segment, locations are referenced using an Offset that is a measure of the distance of the location relative to the bottom of the segment. The bottom of the segment is the segment base.

Every segment has an associated segment descriptor. The segment descriptor has attributes that describe the segment. Two very important components of a segment descriptor are the segment base address and the segment limit. The segment base address identifies the location within the intermediate address space at which the segment begins. The segment limit is used to define the maximum Offset allowed and thereby the size of the segment.

A particular segment is identified using a 13-bit (Segment) Index and a 1-bit (Segment) Table Indicator (TI). The TI identifies which of two tables, the Global Descriptor Table (GDT) or the Local Descriptor Table (LDT), contains the desired descriptor. Furthermore, each task may have its own LDT.

The intermediate address location of the base of the current LDT is specified by the LDT base register, which is identified by the currently active task, which is specified by the current task state descriptor, which is identified by the task state register. The intermediate address location of the base of the GDT is specified by a GDT Base Register. The Index is used to provide an offset to the desired descriptor relative to the base of the indicated table. The 13-bit Index can reference $2^{13}$, or 8,192 descriptors. For interrupts, an Interrupt Descriptor Table (IDT) is indexed using a scaled version of the interrupt vector to provide an offset to the desired descriptor within the IDT.

To reference a segment, the Index and Table Indicator must be loaded into a segment register. Any time an x86 instruction implicitly or explicitly changes any of the segment registers, the Index and TI are used to load the segment base and limit into programmer hidden registers (hereinafter referred to as "descriptor registers") from the descriptor tables stored in the memory/cache subsystem (hereinafter sometimes referred to as the "memory"). Once the segment base and limit are loaded for the associated segment, the Index and TI are no longer used. If the Index and TI are both zero there is no associated segment.

Intersegment changes in control flow always involve a change in the segment register. The segment register is loaded and the descriptor read from memory as prerequisites to adding any Offset to the segment base address. Virtual register file techniques are used to hold the segment's Index, TI, and the descriptor information. Separate virtual register files are used for the segment Index/TI combination, segment base addresses, and limits. When instructions implicitly or explicitly refer to an offset within a particular segment, the address of the associated segment register will specify the particular segment. This address is used to read the segment base address for routing to the relocation adder, discussed next.

Collectively, the GDT Base Register, Task State Register, active Task State Descriptor, active Local Descriptor Table Descriptor, Segment Index, Table Indicator, Segment Descriptor (particularly the base address, segment limit, B, D, and G bits), and Offset can be viewed as a programmer's virtual (logical) address. This view is accurate because all of this state information may affect the resulting intermediate and physical addresses.

The segment base address is added to the Offset to generate the corresponding intermediate address. The adder used is often referred to as the relocation adder. The adder effectively relocates all locations within the segment to an area in the intermediate address space that begins at the segment base address. Note that only the Offset and the segment base address participate in the addition. The Index and Table Indicator, previously used to obtain the segment base address, do not participate in the relocation addition.

Overview of Address Generation in the X86 Architecture

The process of generating addresses can be split into three basic conceptual steps.

In the first step, various general purpose register values and displacement values are added together to form an "Effective Address". The x86 architecture provides addressing modes that combine base registers, index registers (possibly scaled by an operand size) and various sized displacements. Combinations of one or more of these components can be specified, and the result is termed the "Effective Address" or "Offset" (the term used above).

In the second step, the effective address can be adjusted according to a "Base and Bounds" segmentation process. The segmentation process involves relocating the effective address by adding it to a "Segment Base" value, and comparing the effective address against a "Segment Limit" value to prevent unrestricted access to operands in other segments. The resulting address is called an "Intermediate Address".

In the third step, the intermediate address is translated to a "Physical Address" via a two-level memory-resident lookup table. The process of translating an intermediate address to a physical address when paging is enabled is called "Paging".

The following is a conceptual description of the paging process defined by the x86 architecture. The Paging process breaks the 32-bit intermediate and physical address spaces into collections of small, fixed sized blocks called "Pages". The size of a Page in the x86 architecture is 4096 bytes, and a Page is always aligned on a 4096-byte boundary. A Page in the intermediate address space is called a "Virtual" page. A Page in the physical address space is called a "Physical Page". The base address of a Physical Page is called the Page Frame Address.

Paging involves using the intermediate address to access a two-level table structure which maps a Virtual Page to a Physical Page. The tables are stored in memory. (A Translation Lookaside Buffer (TLB) may be available to cache recent virtual page to physical page translations, and to thereby obviate the need for accessing the two-level table structure in memory for some translations. When a TLB is available, the required Page Frame Address is always retrieved from the TLB. If necessary, the required Page Frame Address will first be retrieved from the two-level table structure in memory and stored into an entry of the TLB. The presence of a TLB will, hereinafter, be assumed. However, the presence of the TLB is not essential to the invention disclosed herein.)

A first level table is called a Page Directory, and each of its entries is called a Page Directory Entry (PDE). The Page Directory is itself a 4096-byte block aligned on 4096 byte boundary, and may be thought of as occupying a Physical Page. Each PDE is four bytes in size and contains the base address of a Page Table (20 bits), a Valid bit, an Accessed bit, several Protection bits, and several Attribute bits.

The base address of the currently active Page Directory is given by a dedicated register called CR3. Each separate task (or process) may have a unique Page Directory, allowing each task to have its own virtual to physical address mapping.

Each of the second level tables is called a Page Table, and each of its entries is called a Page Table Entry. The Page Table is also a 4096-byte block aligned on a 4096-byte boundary, and can be thought of as occupying a Physical Page. Each PTE is four bytes in size and contains the base address of a Physical Page (i.e. a 20-bit Page Frame Address), a Valid bit, an Accessed bit, a Dirty bit, several Protection bits, and several Attribute bits. The base address of a Page Table is given by a valid PDE.

If the Valid bit of a PDE is not asserted, then the remaining fields of the PDE are undefined, and no second level table is currently available for the requested intermediate address. Similarly, if the Valid bit of a PTE is not asserted, then the remaining fields of the PTE are undefined, and no physical Page Frame is currently available for the requested intermediate address. In either of these cases, the instruction that generated the address is aborted (faulted) and a Page Fault Exception is signaled to the operating system.

The Protection bits of the PDE are compared against the current privilege level of the processor and against the type of memory reference being made. The Protection bits of the PTE are similarly compared. If either of these checks results in a protection violation, the instruction that generated the address is aborted (faulted) and a Page Fault Exception is signaled.

The intermediate address is broken into three portions. Bits [31:22] are used as an index into the Page Directory. Bits [21:12] are used as an index into the Page Table. Bits [11:0] are used as the index into the selected Physical Page (the Page Frame), and are also called the Page Offset. Thus, every intermediate address and corresponding physical address share the same 12 least significant bits.

In addition, the operating system can disable the paging process by clearing a control register bit (i.e. CRO.PG). In this case the most significant 20 bits of the Intermediate Address become the Page Frame Address without translation.

In summary, the conceptual steps performed in translating an intermediate address when paging is enabled are as follows. The CR3 register is combined with bits [31:22] of the intermediate address and the selected PDE is read from memory. The PDE Valid and Protection bits are checked and a Page Fault Exception is signaled if necessary. The Base of the Page Table (extracted from the PDE) is then combined with bits [21:12] of the intermediate address and the selected PTE is read from memory. The PTE Valid and Protection bits are checked and a Page Fault Exception is signaled if necessary. The Page Frame Address is extracted from the PTE, and combined with bits [11:0] of the intermediate address to form the full 32 bit Physical Address.

Caching Segment Descriptors

Various instructions (hereinafter referred to as "segment selector load instructions") cause a segment descriptor to be loaded into a descriptor register. There are three types of segment selector load instructions (corresponding to the type of the segment whose descriptor is loaded): code segment load (i.e. a far branch instruction specifying a branch to a location outside the current code segment), (non-stack) data segment load, and stack segment load. A segment selector load instruction specifies a 16-bit selector to be loaded into a segment register. Bits [15:3], [2], and [1:0] of the selector store a 13-bit (Segment) Index, a 1-bit (Segment) Table Indicator (TI), and a 2-bit Requestor Privilege Level (RPL), respectively. The particular segment descriptor to be loaded is identified using the 13-bit (Segment) Index and the 1-bit (Segment) Table Indicator (TI), as described above.

One technique for obtaining the required segment descriptor involves the retrieval, from the appropriate descriptor table in memory (either the LDT for the current task or the GDT, depending on the TI bit of the specified selector), of the segment descriptor located at the intermediate address given by the sum of the base intermediate address of the descriptor table (which is stored either in the current LDT Base Descriptor or in a GDT Base Register) and 8 times (since each descriptor occupies 8 bytes) the value stored in the Index field of the specified selector. The obtained intermediate address for the descriptor must be translated into a corresponding physical address, as described above, before retrieval of the descriptor from memory can occur.

An alternative technique involves the use of a descriptor cache for storing segment descriptors recently retrieved from memory. In this technique, the descriptor cache is searched for the required segment descriptor. If it is found, the segment descriptor is loaded from the descriptor cache into the appropriate hidden descriptor register (thereby avoiding a relatively time consuming access to a segment descriptor table in memory). If not present in the descriptor cache, the required segment descriptor is retrieved from memory in the manner discussed above. One type of segment descriptor cache is disclosed in UK Patent Application 2,260,629 (hereinafter "the INTEL patent application"), entitled "A Segment Descriptor Cache for a Microprocessor".

One issue introduced by the use of a descriptor cache is memory-cache coherence. In particular, given that sometimes programs change the contents of descriptor tables in memory, there is a need for some scheme that maintains coherence between the contents of the descriptor tables and the contents of the descriptor cache. Only with such a scheme, can the descriptor cache be relied upon to substitute for an access to a descriptor table in memory. (The Intel patent application does not disclose a scheme for maintaining coherence between the memory and descriptor cache.)

Somewhat extensive checking must be performed when loading a hidden descriptor register with a segment descriptor from memory. The checking involves comparisons between the current privilege level (i.e. the privilege level at which the selector load instruction is executing), the descriptor privilege level (a field of the descriptor, indicating the least privileged level at which a task may access the descriptor and the segment associated with the descriptor) and the requestor privilege level (i.e. bits [1:0] of the selector). The detailed description section of U.S. Pat. No. 4,442,484, entitled "Microprocessor Memory Management and Protection Mechanism", describes an example of the above checking. What would be desirable is a technique, to be used in conjunction with a descriptor cache, that takes advantage of the fact that the extensive checking was originally satisfied when a descriptor was loaded into the descriptor cache (and a hidden descriptor register) and thereby simplifies the condition checking performed before a hidden descriptor register is subsequently loaded with the same segment descriptor from the descriptor cache.

SUMMARY OF THE INVENTION

The present invention provides a structure for, and a method of operating, a descriptor cache to store segment descriptors retrieved from memory.

In one embodiment, the descriptor cache is direct-mapped and addressed by a first part of the physical address in memory at which a desired descriptor is stored. If the desired descriptor is not stored in the addressed entry of the descriptor cache then the descriptor is retrieved from a descriptor table held in memory and loaded into the addressed entry of the descriptor cache (which will then be able to satisfy future requests for the same descriptor). At the same time, a second part of the descriptor's physical address is loaded into an entry of a physical address cache corresponding to the addressed entry of the descriptor cache. Whenever a write to the memory occurs, the physical address cache receives the physical address written into and compares the contents of the entry of the physical address cache addressed by the first part of the physical address with the second part of the physical address. If a match occurs, the corresponding entry of the descriptor cache is modified to indicate invalidity. In this way, coherence between the descriptor tables held in memory (which may be modified) and the descriptor cache is maintained.

For a fuller understanding of the nature and advantages of the invention, reference should be made to the ensuing detailed description taken in conjunction with the accompanying drawings.

DESCRIPTION OF THE SPECIFIC EMBODIMENTS

Segment Descripter Cache Unit

Figure 1:
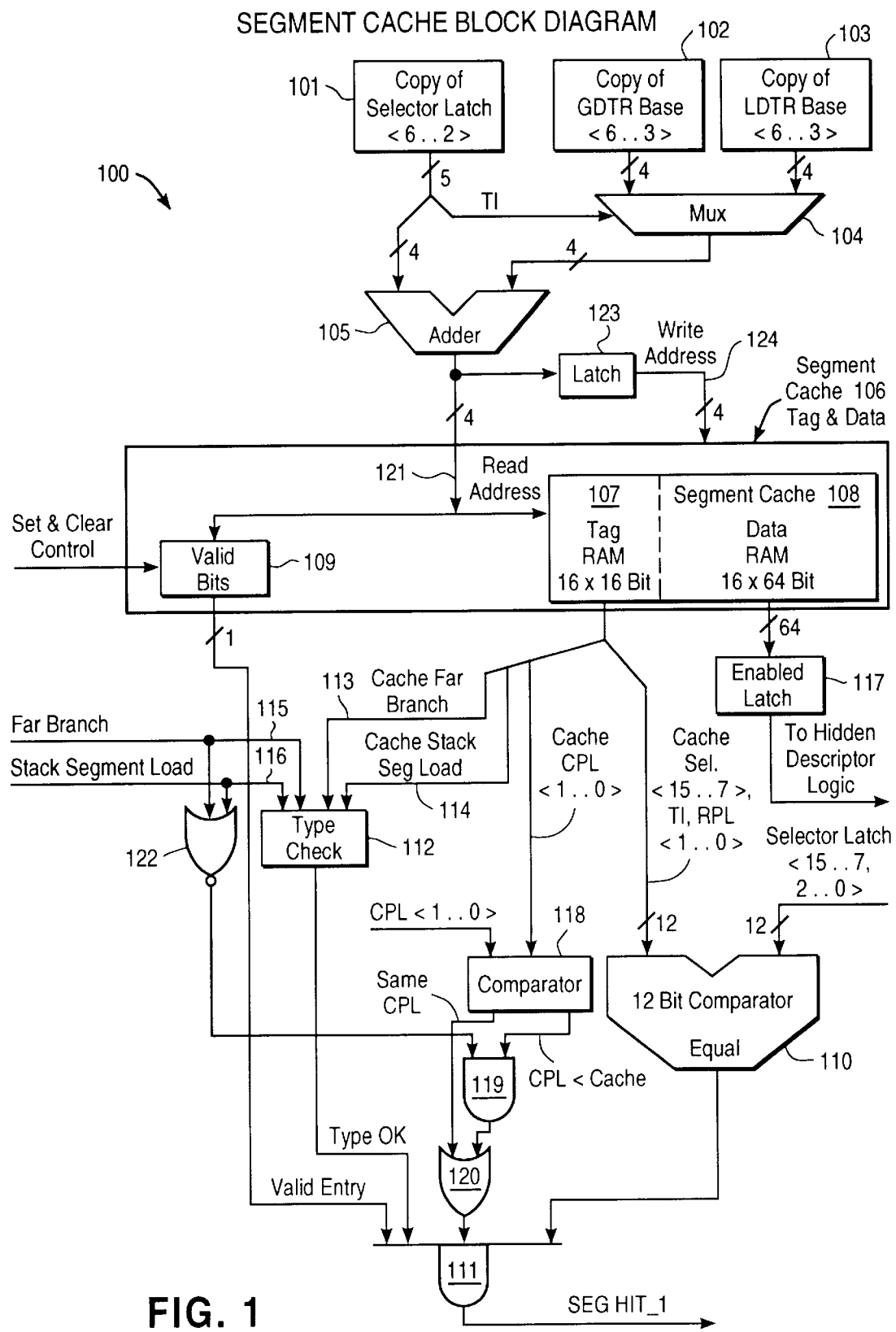
FIG. 1 is a block diagram of a descriptor cache unit in accordance with the present invention.

FIG. 1 is a block diagram of a segment descriptor cache unit 100 in accordance with this invention. During the execution of a segment selector load instruction (hereinafter referred to as the "current instruction"), a selector (hereinafter referred to as "the new selector") specified by the instruction is loaded into a temporary selector latch (not shown) outside descriptor cache unit 100. A copy of bits 6:2 of the selector latch are stored within descriptor cache unit 100 in a latch 101. A latch 102 stores bits 6:3 of the base intermediate address of the global descriptor table. A latch 103 stores bits 6:3 of the base intermediate address of the local descriptor table for the task that issued the current instruction. (Both the global and local descriptor tables are assumed to begin on an octet boundary and are required to do so for the segment cache to be enabled. In other words, the 3 least significant bits of their respective base intermediate addresses are assumed to be zeroes.)

The select line of a 2-to-1 4-bit multiplexer 104 is coupled to the element of latch 101 storing bit 2 of the new selector (as described above bit 2 of a selector, the TI or Table Indicator bit, indicates whether the selector is global or local). The 4-bit data inputs of multiplexer 104 are coupled to latches 102 and 103, respectively. The 4-bit inputs of a 4-bit adder 105 are coupled to the elements of latch 101 storing bits 6:3 of the new selector and to the output of multiplexer 104, respectively. Thus, adder 105 produces bits 6:3 of the intermediate address of the segment descriptor corresponding to the new selector. These bits are also bits 6:3 of the physical address of the segment descriptor corresponding to the new selector, since as discussed above an intermediate address and corresponding physical address share the same 12 least significant bits. The significance of this latter fact in facilitating coherence between descriptors stored in descriptor cache unit 100 and descriptors stored in memory, is discussed further below.

The 4-bit part of a descriptor's physical address produced by adder 105 is inputted to a direct-mapped segment descriptor cache 106 (consisting of a TAG RAM 107, a DATA RAM 108, and a valid bit array 109) on a read address line 121. (Hereinafter, corresponding entries of RAMs 107 and 108 and array 109 may be referred to as an entry of cache 106.)

Figure 2:
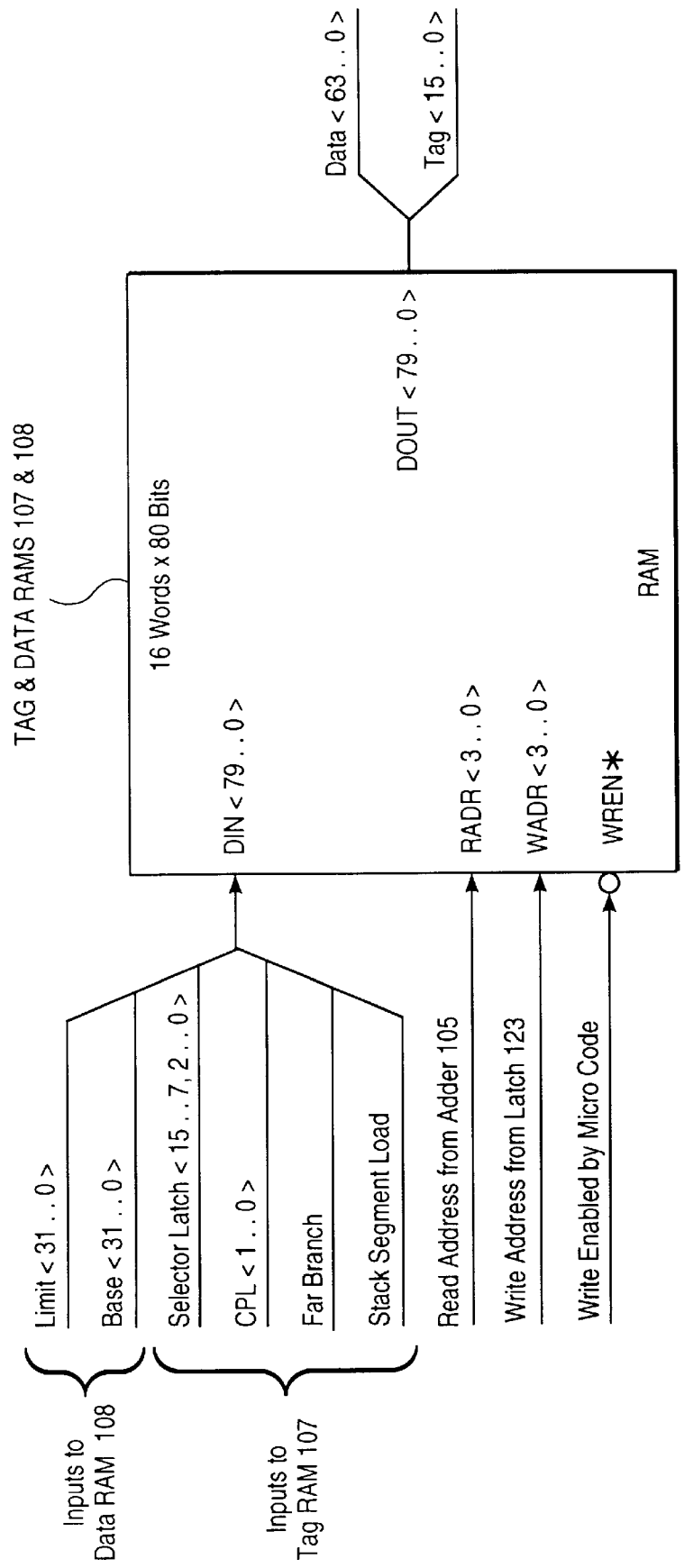
FIG. 2 is a diagram illustrating inputs and outputs of the cache of FIG. 1.

FIG. 2 depicts the inputs and outputs of TAG RAM 107 and DATA RAM 108. Each entry of TAG RAM 107 is 16 bits and contains bits 15:7 and 2:0 of a selector ("selector bits"), 2 bits indicating what the current privilege level (CPL) was when the entry was made ("CPL bits"), i.e. the privilege level at which the segment selector load instruction (that caused the entry to be created) was executing, a bit indicating whether the entry was loaded into RAM 107 as a result of a far branch instruction ("far branch bit") and a bit indicating whether the entry was loaded into RAM 107 as a result of a stack segment load instruction ("stack segment bit").

Each entry of DATA RAM 108 is 64 bits and contains a segment descriptor for the selector stored in the corresponding entry of TAG RAM 107, and, in particular, a 32-bit base field (specifying the intermediate address of the base of the corresponding segment) and a 32-bit limit field (specifying the size of the segment and its protection or access rights attributes). The base and limit fields from the accessed entry of DATA RAM 108 are loaded into a latch 117 that is enabled under microcode control. Valid bit array 109 consists of 16 one-bit entries, each of which indicates whether the corresponding entry in RAMs 107 and 108 is valid.

A hit in segment descriptor cache 106, indicated by an asserted output of an AND gate 111, occurs only if all four of the following conditions are met:

1) The addressed valid bit in valid bit array 109 indicates validity.

2) The selector bits of the addressed entry of TAG RAM 107 (i.e. the part of the entry containing bits 15:7 and 2:0 of a selector) matches the corresponding bits in the new selector (which, as described above, is loaded into a temporary latch outside the cache unit 100). This determination is made by a 12-bit comparator 110, whose inputs are coupled to the selector bits of the addressed entry of TAG RAM 107 and to bits 15:7 and 2:0 of the temporary latch storing the new selector.

3) The current instruction is of the same type (i.e. either stack segment load, non-stack data segment load or far branch) as the instruction that caused the creation of the addressed entry of descriptor cache 109. This determination is made by type check logic 112 which is coupled to the far branch and stack segment bits of the addressed entry of TAG RAM 107, via input lines 113 and 114, respectively, and which receives on input lines 115 and 116 signals, indicating whether the current instruction is a far branch and a stack segment load, respectively. The output of type check logic 112 indicates a type match between the current instruction and the segment selector load instruction that caused the creation of the addressed entry of descriptor cache 106 if and only if: a) the current instruction is a far branch AND the far branch bit of the addressed entry of TAG RAM 107 is set; OR b) the current instruction is a stack segment load AND the stack segment bit of the addressed entry of TAG RAM 107 is set; OR c) the current instruction is a non-stack data segment load AND neither of the far branch and stack segment bits of the addressed entry of TAG RAM 107 is set.

4) Either a) The CPL of the current instruction is equal to the value specified by the CPL bits of the addressed entry of TAG RAM 107; OR b) the current instruction is a data segment load (i.e., not a far branch or a Stack segment load) AND the CPL of the current instruction is less than the value specified by the CPL bits of the addressed entry of TAG RAM 107. This determination is carried out by a comparator 118, an AND gate 119, an OR gate 120, and a NOR gate 122.

Storing the type of the instruction causing a descriptor to be loaded into segment descriptor cache 106 (i.e. the far branch and stack segment bits) and the current privilege level (CPL) of the instruction in TAG RAM 107 permits conditions (3) and (4), above, to substitute for more extensive and time consuming condition checking that must be performed when loading a hidden descriptor register with a segment descriptor from memory. The condition checking involves the current privilege level, the descriptor privilege level (a field of the descriptor, indicating the least privileged level at which a task may access the descriptor and the segment associated with the descriptor) and the requestor privilege level (i.e. bits [1:0] of the selector). This advantage, resulting from the storage of instruction type and current privilege level in segment descriptor cache 106, arises regardless of whether or not segment descriptor cache 106 is addressed by part of the descriptor's physical address.

The more extensive checking that would otherwise be performed depends on the type of the descriptor to be loaded and the type of the load instruction. Conditions (3) and (4) can substitute for this more extensive checking, because a first segment selector load instruction (specifying a particular selector) having the same type as a second segment selector load instruction that caused the creation of an entry of segment descriptor cache 106 storing the particular selector, and executing with a CPL value equal to that at which the second load instruction was executing (or with a lower CPL value, i.e. higher privilege, if the instruction type is data segment load) is guaranteed to pass the more extensive checking, given that the second load instruction previously passed this checking.

In addition to the above four conditions, there may be one or more conditions required for a hit, such as enablement of descriptor cache unit 100 by the microcode and/or disablement of debug logic.

If a hit in segment descriptor cache 106 occurs (i.e. if all of the above conditions are satisfied), then the microcode will branch to a location for the hit response of the current instruction if no other microcode branch instruction is asserted. At the hit response location for the current instruction, the base and limit fields of the addressed entry of DATA RAM 108, which have been held in previously enabled latch 117, are loaded into the appropriate hidden segment descriptor register, thereby obviating the need to access to a segment descriptor table held in memory. The microcode then branches to its next processing location unless the addressed valid bit of valid bit array 109 indicates invalidity, in which case the microcode will "fall through" to the next sequential microcode location.

The reason for this additional testing of the addressed valid bit of valid bit array 109, is as follows: A write to the physical location in memory storing the descriptor cached in the addressed entry of descriptor cache 108, resulting from an instruction that began execution before the current instruction, may have occurred after the time satisfaction of the above described hit conditions is determined. Such a write would, as described further below in more detail, result in the clearing of the addressed valid bit, in order to indicate that the information cached in the addressed entries of TAG RAM 107 and DATA 108 is no longer valid.

At the "fall through" location the microcode initiates retrieval of the required descriptor from the memory/cache subsystem (i.e. from the appropriate descriptor table) and branches to the microcode that would have been executed if a miss had occurred instead of a hit.

If, on the other hand, a hit does not occur, then the microcode proceeds to the next sequential location, where the required segment descriptor is retrieved from a segment descriptor table stored in the memory/cache subsystem and, as discussed above, loaded into a hidden descriptor register. In addition, the following information is loaded into the entry of descriptor cache 106 addressed by the signal carried on a write address line 124 (and output by a latch 123 receiving the output of adder 105, which as described above is part of the desired descriptor's physical address), so that if the descriptor is required at some future point, it can be retrieved from descriptor cache 106:

a) The base, limit, and access rights fields of this descriptor are written into the addressed entry of data RAM 108.

b) Bits 15:7 and 2:0 of the new selector are written into the corresponding entry of TAG RAM 107, as are the CPL of the current instruction and two one-bit flags indicating whether the current instruction is a far branch and a stack segment load, respectively.

c) The 25 most significant bits of the physical address of the retrieved descriptor is stored in the corresponding entry of a segment physical address cache (as described below in more detail). This step is performed when the update physical address of the "accessed" bit of the descriptor has been formed by the TLB even though no write of the "access" bit will occur since it is required to be set in order to make an entry into the cache.

The valid bit of the addressed entry of cache 106 is cleared by the microcode prior to step (a) to indicate invalidity. If no faults relating to the loading of the descriptor have occurred by the time step (c) has been performed, then the microcode sets the addressed valid bit to indicate validity. In this way, the possibility of a partially updated entry of descriptor cache 101 with a set valid bit is avoided. (The setting of the valid bit can occur when the AP completes its current instruction even if that instruction is later aborted because of conditions unrelated to any possible fault in the loading of the required descriptor. For example, a prior branch instruction may have had its direction incorrectly predicted).

The above steps with respect to loading a descriptor into an entry of descriptor cache 106 are not performed if the accessed bit of the retrieved descriptor is not set, in order to avoid the situation of creating a valid entry in cache 106 for a descriptor whose accessed bit update might be aborted. If this incorrect situation were to occur, requests for the loaded descriptor would be satisfied from descriptor cache 106, and the accessed bit of the descriptor stored in memory would never be set, thereby providing the operating system with incorrect descriptor usage information.

Figure 3:
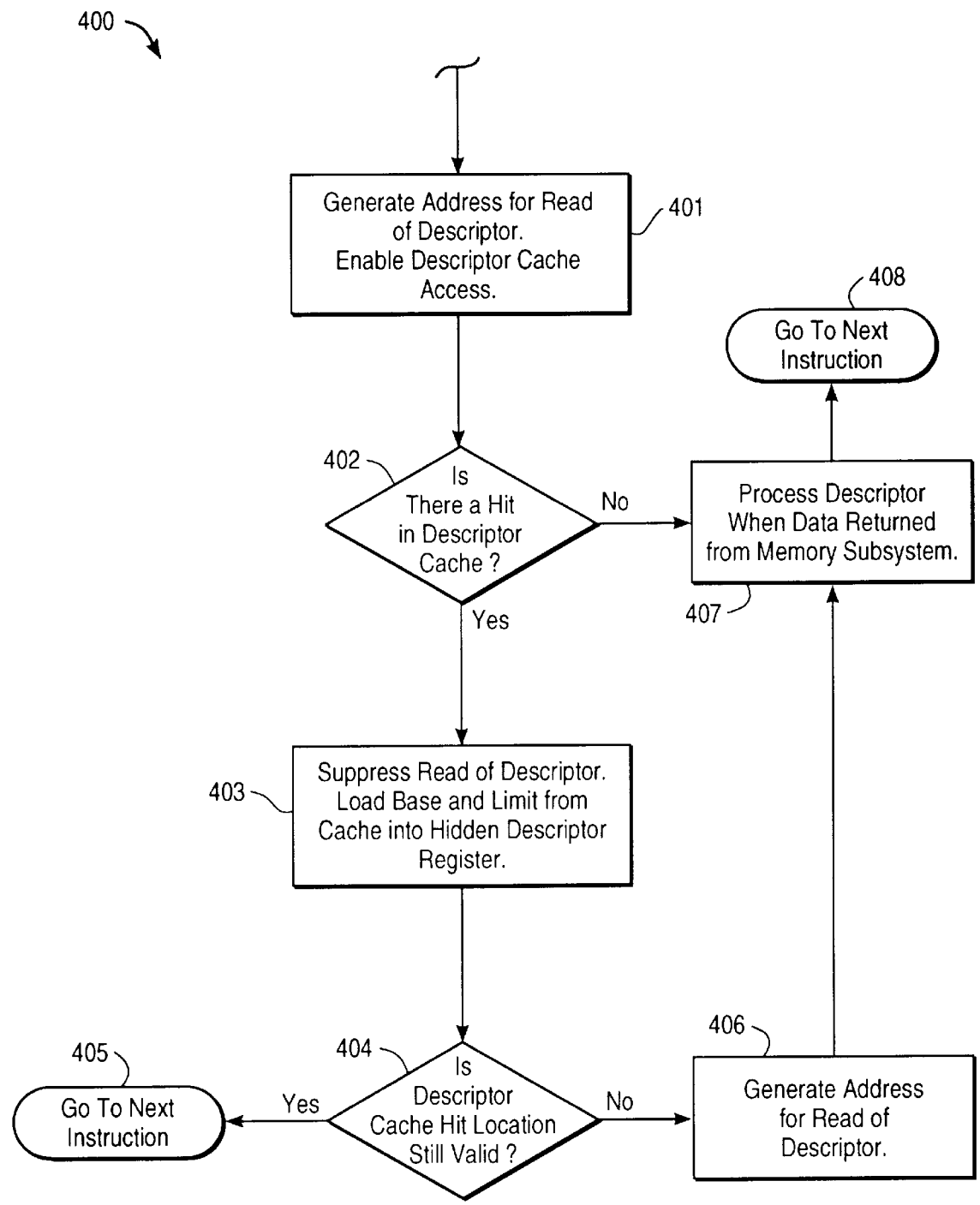
FIG. 3 is a flowchart illustrating an overview of the processing performed by the hardware under the control of a microcode program for a segment selector load instruction, in accordance with the present invention.

FIG. 3 illustrates a flowchart 400 depicting an overview of the processing performed, in one embodiment, by the hardware under the control of a microcode program for a segment selector load instruction. In step 401, the process of generating the physical address (in a descriptor table) of the descriptor specified by the segment selector load instruction and then issuing a read request to the memory/cache subsystem for that physical address is initiated. In addition, the process of enabling cache unit 100 to search for the required descriptor is initiated in step 401.

In decision step 402, the microcode determines whether or not there was a hit in cache unit 100 resulting from the cache access initiated in step 401. If not, the microcode processes the required descriptor when returned from the memory/cache subsystem in step 407. From step 407, processing transfers to step 408 where the processing for the next machine instruction to be executed commences.

If in step 402 the microcode determines that there was a hit in cache unit 100, then the microcode causes the process, initiated in step 401, of reading the required descriptor from a descriptor table in memory to be suppressed by preventing the transfer of the physical address to the memory/cache subsystem. In addition, the microcode causes the required descriptor to be read from the "hit" location of cache 106 into a hidden descriptor register.

In decision step 404, the microcode determines whether the valid bit in the "hit" location of cache 106 indicates validity. If so, processing transfers to step 405 where the processing for the next machine instruction to be executed commences. If not, then the required descriptor in memory must have been overwritten since the time a hit was determined in step 402 and, thus, access to the descriptor table in memory is required after all. Thus, in step 406 the microcode initiates the process of generating the physical address (in a descriptor table) of the descriptor specified by the segment selector load instruction and then issuing a read request to the memory/cache subsystem for that physical address. From step 406, processing transfers to step 407, described above.

Figure 4:
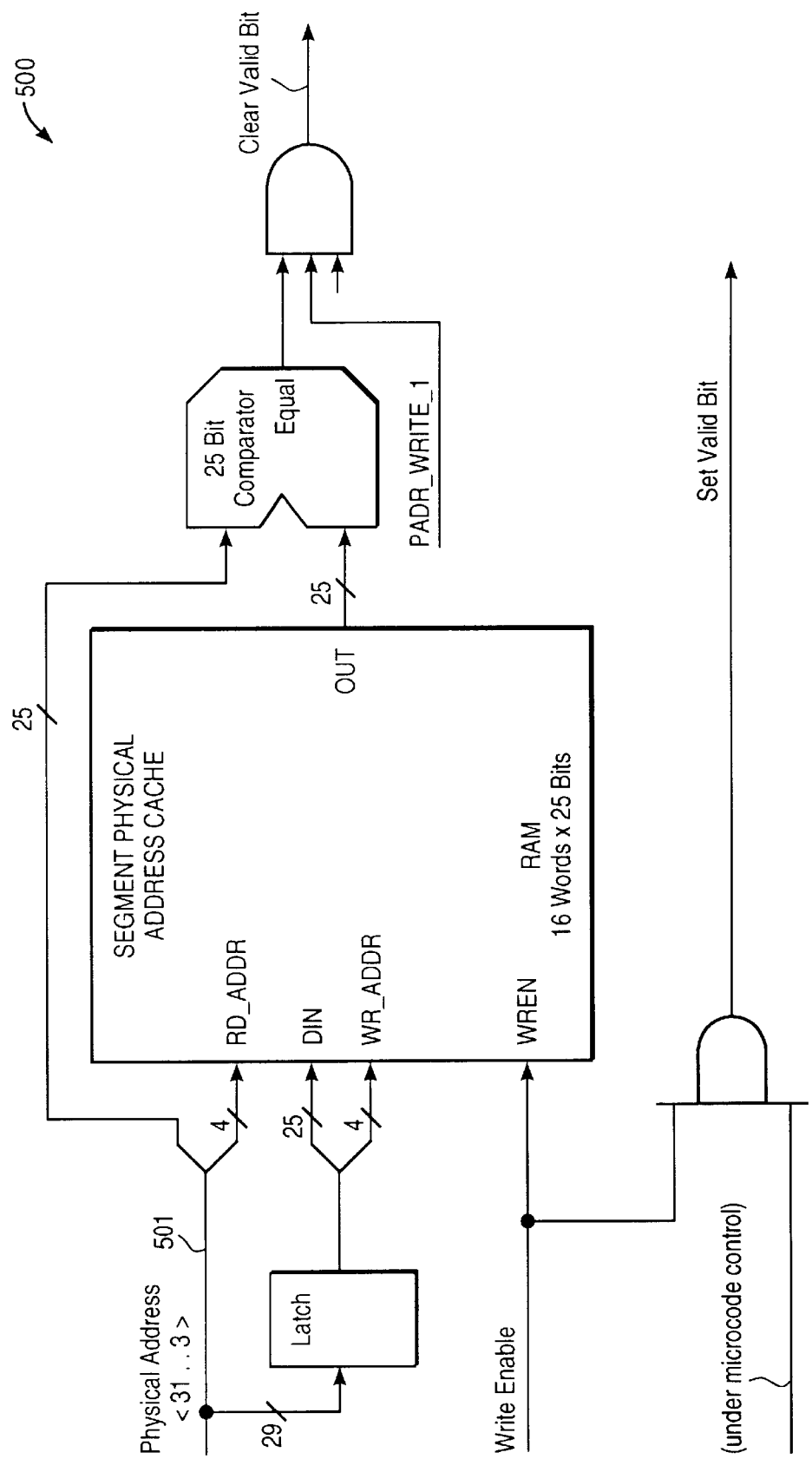
FIG. 4 is a block diagram of a physical address cache in accordance with the present invention.

FIG. 4 illustrates a direct-mapped 16-entry physical address cache 500 for facilitating a coherence scheme between segment descriptor cache 106 and memory. Each entry of cache 500 can store the 25 most significant bits of a physical address in memory at which a segment descriptor is stored. When a descriptor is retrieved from the memory/cache subsystem and placed into segment descriptor cache 106, as described above, the 29 most significant bits of the physical address passed by the TLB to the memory/cache subsystem for the retrieval are received by cache 500 from the TLB on input lines 501 and bits 31:7 of the physical address are stored in the entry of cache 500 addressed by bits 6:3 of the physical address. (The three lower-order bits of the physical address can be ignored since, as discussed above, each descriptor table, and hence each (8-byte) descriptor is assumed to start on an octet boundary.) After this write to cache 500 has occurred, the addressed valid bit of valid bit array 109 is set to indicate validity, as discussed above.

Physical address cache 500 maintains coherence between segment descriptor segment descriptor cache 106 and the memory/cache subsystem in the following manner. Whenever the memory/cache subsystem performs a write to a particular physical address, bits 31:3 of the physical address are received by cache 500 on input lines 501 from the TLB (in the case of a CPU write to memory) or from the memory/cache subsystem (in the case of a write to memory by a device other than the CPU, such as a DMA controller). Bits 6:3 of this physical address are used to address cache 500 for reading. If the 25 most significant bits of the physical address match the 25-bit physical address stored in the addressed entry of cache 500, then the entry of valid bit array 109 addressed by bits 6:3 of the physical address is cleared to indicate invalidity because the descriptor in the corresponding entry of DATA RAM 108 is no longer valid due to a write to memory at the physical address where the descriptor was stored.

The fact that segment descriptor cache 106 is addressed by part of the descriptor's physical address (as opposed to, for instance, part of the selector) allows cache 500 to be a direct-mapped cache that is addressable by the same part of a physical address. If, on the other hand, a part of the selector pointing to the desired descriptor were used to address descriptor cache 106 (as, for example, in the descriptor cache disclosed in the INTEL patent application), then the address specifying the entry of descriptor cache 106 and the corresponding entry of physical address cache 500 into which (upon retrieval of the descriptor from a descriptor table in memory) the descriptor and part of the descriptor's physical address would be respectively written, would not be part of the descriptor's physical address. Thus, the entry of cache 500 storing the physical address of a descriptor previously stored in cache 106 would not be determinable from the physical address. For this reason, when cache 500 would be informed of a write to a physical address, every entry of cache 500 would have to be compared against the specified physical address (as opposed to just one entry, i.e. the entry addressed by bits 6:3 of the descriptor's physical address, in the main embodiment described above). This would be costly either in cycles or in hardware (e.g. a fully associative physical address cache might be required).

In other embodiments, segment descriptor cache 106 could be a set-associative cache, addressed by part of the descriptor's physical address. Addressing the set-associative segment descriptor cache 106 by a part of the descriptor's physical address would permit physical address cache 500 to be a set-associative cache addressable by a corresponding part of a received physical address. In one such embodiment, the hit conditions, described above, could be determined in parallel (through duplicate hardware) for each entry in the set of cache 106 addressed by bits 6:3 of the descriptor's physical address. In the event of a miss in cache 106, the required descriptor would be retrieved from memory, and loaded into the appropriate hidden descriptor register and into one of the entries (as per some replacement policy) of the set of cache 106 addressed by bits 6:3 of the descriptor's physical address. Bits 31:7 of the descriptor's physical address would be loaded into the corresponding entry of the set of cache 500 addressed by bits 6:3 of the descriptor's physical address.

When cache 500 would be informed of a write to a physical address, each entry of the set of cache 500 addressed by bits 6:3 of the physical address would be compared against bits 31:7 of the physical address. In the event of a match, the entry of cache 106 corresponding to the matching entry of cache 500 would be invalidated. If such a set-associative cache 106 were addressed by a part of the selector (instead of by a part of the descriptor physical address) every entry of every set of cache 500 would have to be compared against the specified physical address, for the same reasons as presented above for a direct-mapped cache 106 addressed by a part of the selector.

System Embodiments

Figure 5:
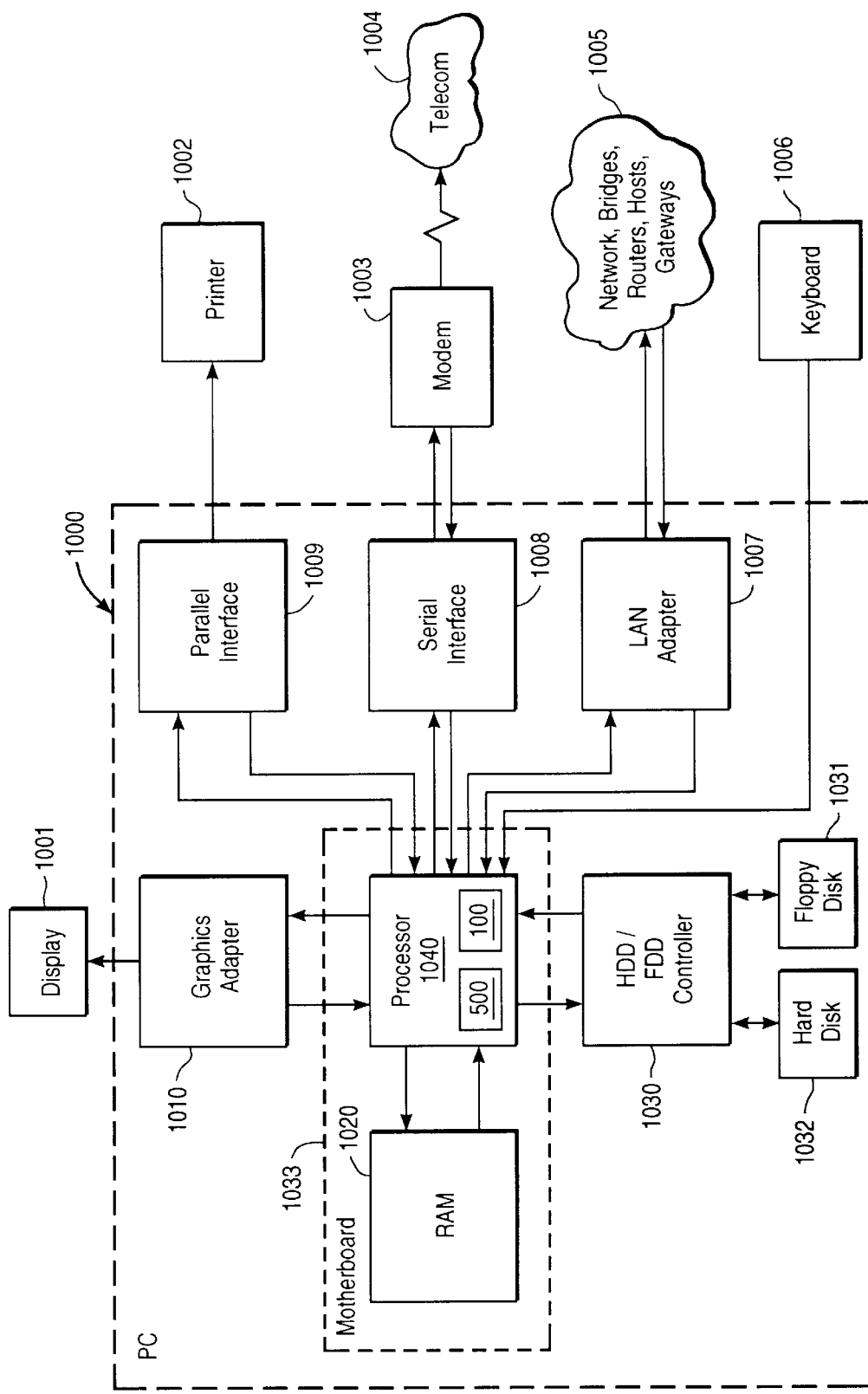
FIG. 5 is a block diagram of a personal computer incorporating a processor that contains a descriptor cache unit in accordance with an embodiment of the present invention.
Figure 6:
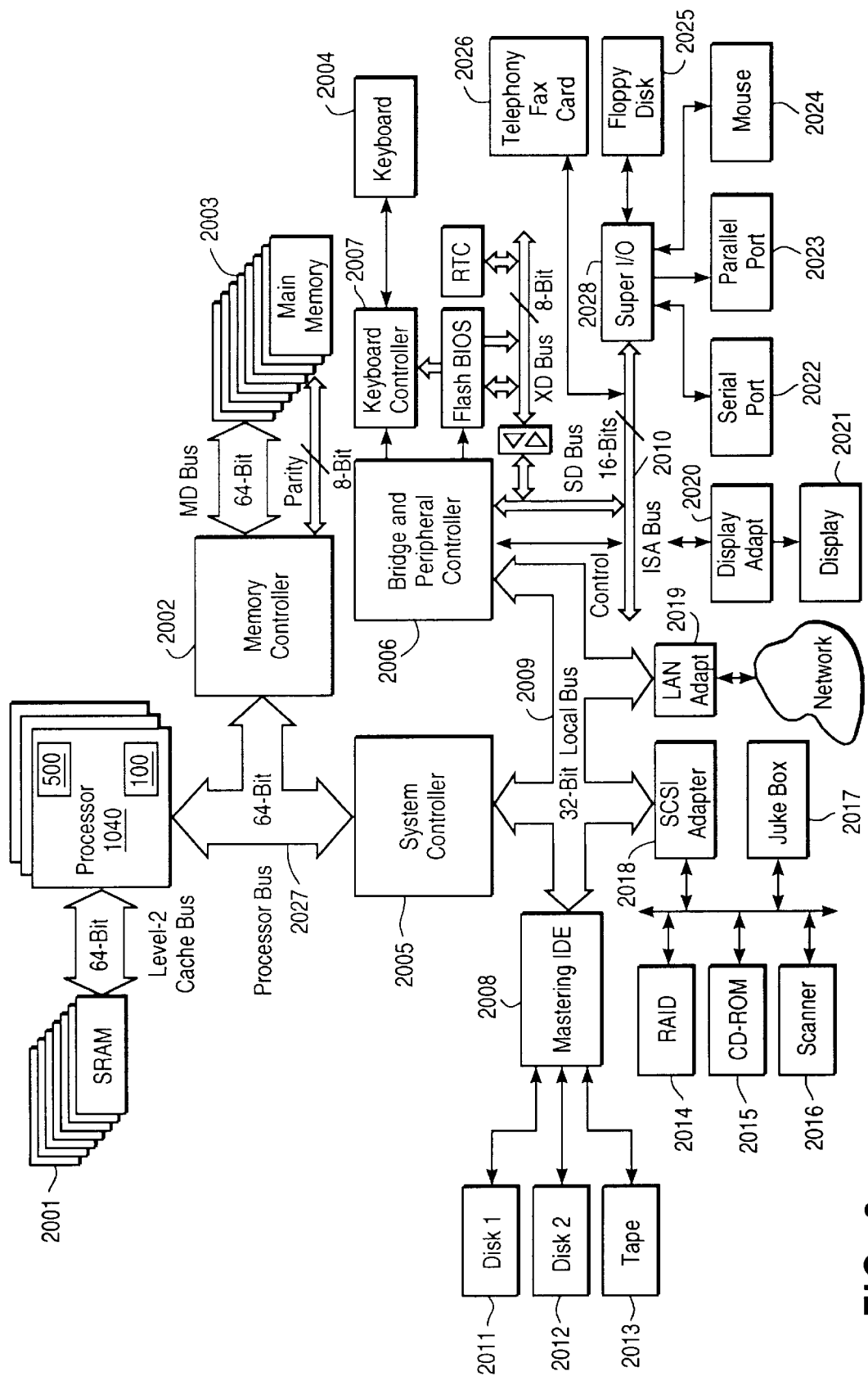
FIG. 6 is a block diagram of a networked server computer incorporating a processor that contains a descriptor cache unit in accordance with an embodiment of the present invention.
Figure 7:
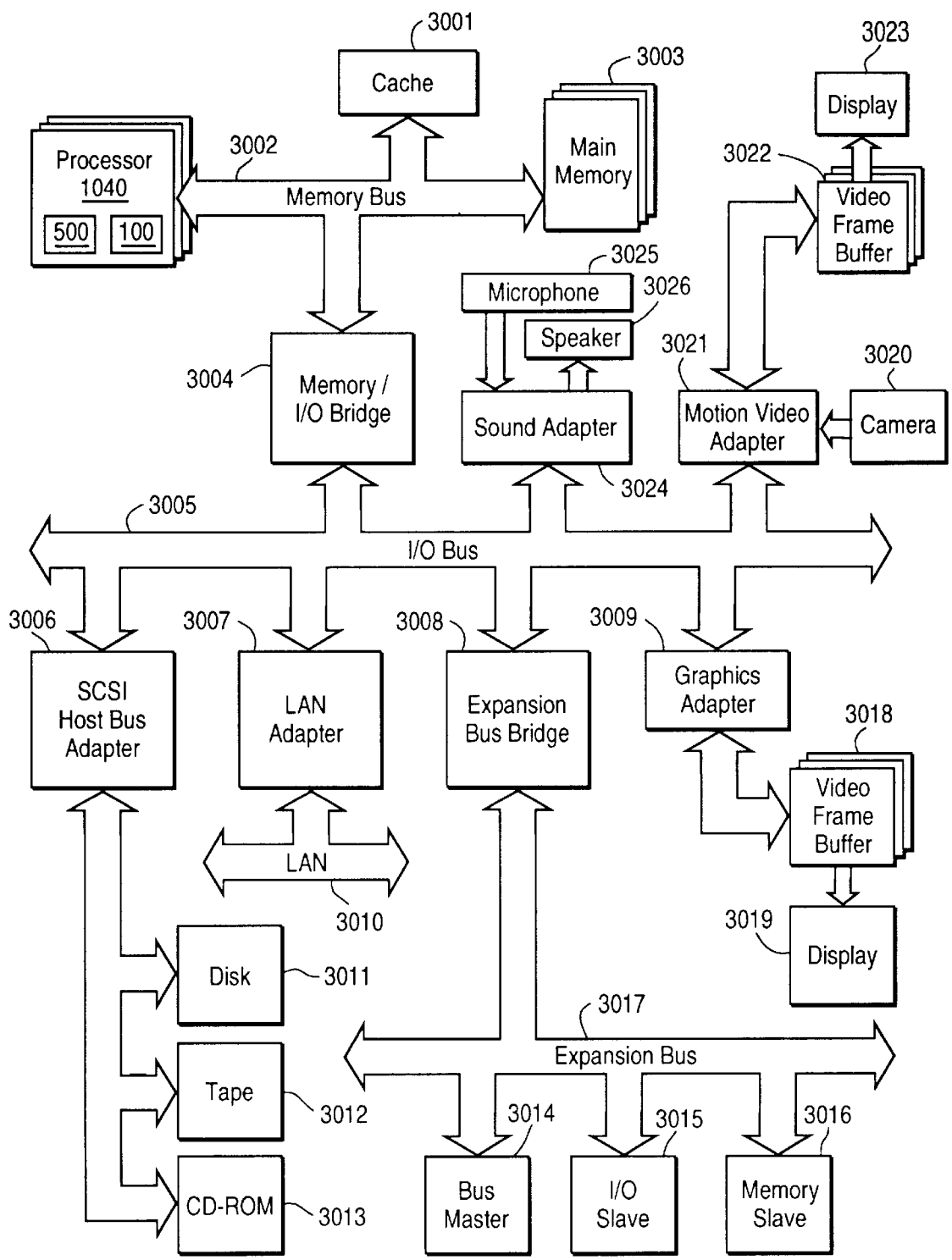
FIG. 7 is a block diagram of a multimedia computer incorporating a processor that contains a descriptor cache unit in accordance with an embodiment of the present invention.

A processor containing a descriptor cache unit in accordance with this invention may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 5–7 depict an illustrative set of suitable system configurations for a processor 1040 that contains segment descriptor cache unit 100 and physical address cache 500. In particular, FIGS. 5–7 depict suitable combinations of a processor containing a descriptor cache unit in accordance with this invention with suitable, bus configurations, memory hierarchies, and cache configurations, I/O interfaces, controllers, devices, and peripheral components.

The set of system configurations depicted in FIGS. 5–7 is merely illustrative and alternate combinations of bus configurations, memory hierarchies, I/O interfaces, controllers, devices, and peripheral components are also suitable. For example, suitable configurations for a system incorporating processor 1040 include combinations of components, cards, interfaces, and devices such as:

1. video display devices, monitors, flat-panel displays, and touch screens;
2. pointing devices and keyboards;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc.;
8. video cards and devices, 2-D and 3-D graphics cards, frame buffers, MPEG/JPEG compression/ decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices. FIGS. 5–7 are illustrative of an exemplary subset of the full set of suitable combinations.

FIG. 5 shows a networked personal computer incorporating processor 1040. Processor 1040 is coupled to memory subsystem 1020 (which stores descriptor tables). In the embodiment of FIG. 5, memory subsystem 1020 is shown as RAM, although alternative embodiments include a cache or caches interposed between the RAM and processor 1040. Control logic and storage for such a cache may be distributed among the memory subsystem 1020 and the processor 1040. For example, level 1 caches (i.e., instruction cache and data cache) and cache control logic may be included in processor 1040 and a level 2 cache may be included as part of memory subsystem 1020. Alternative distributions are also suitable, although the level 1 caches are preferably on-chip with processor 1040.

In the embodiment of FIG. 5, processor 1040 and memory subsystem 1020 are included as parts of motherboard 1033. A series of adapters, interfaces and controllers couple the processor to devices and peripheral components. These adapters, interfaces and controllers are typically be coupled to the processor as cards in a backplane bus of motherboard 1033. However, alternative embodiments may incorporate individual adapters, interfaces and controllers into motherboard 1033. For example, a graphics adapter 1010 may be included on motherboard 1033 with processor 1040. In either case, graphics adapter 1010 is coupled to processor 1040 via busses such as those described below with reference to FIGS. 6 and 7. Graphics adapter 1010 drives signals to control a display 1001 in accordance with screen updates supplied by processor 1040. A parallel interface 1009 and a serial interface 1008 provide parallel port and serial port signaling interfaces for respectively interfacing to parallel port devices (e.g., printers such as a parallel printer 1002, tape backup units, etc.) and to serial devices (e.g., a modem 1003, pointing devices, and printers). In the embodiment of FIG. 5, parallel interface 1009 and serial interface 1008 are shown as separate interfaces although each is often incorporated with a hard disk/floppy disk controller (such as 1030) as a multifunction card. Hard disk/floppy disk controller 1030 controls access to the media of a hard disk 1032 and to a floppy disk 1031. Typically, hard disk/floppy disk controllers such as hard disk/floppy disk controller 1030 provide some level of buffering of reads and writes. Hard disk/floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/floppy disk controller 1030 are of any such suitable design.

Finally, a LAN adapter 1007 provides a network interface to local area networks such as 802.3 ethernet, 10 base-T, twisted pair, and token ring networks. As with the other adapters and interfaces, LAN adapter 1007 is typically coupled to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

In the network server configuration of FIG. 6, multiple instances of processor 1040 are shown coupled to a level 2 cache 2001 and to a processor bus 2027. In the embodiment of FIG. 6, processor 1040 includes control logic for a cache 2001. The cache control logic (not shown) is coupled to cache 2001 via a 64-bit cache bus. Alternate embodiments of processor 1040 may offload the functionality of control logic for cache 2001. In such an alternative embodiment, the cache control logic may be interposed between processor 1040 and level 2 cache 2001. In the context of bus structures presented in FIG. 6, the cache control logic could be coupled to processor 1040 via processor bus 2027. Suitable modifications to the cache configuration of FIG. 6 (such as providing a cache in processor 1040) will be apparent to those skilled in the art.

Referring again to FIG. 6, processor 1040 is coupled to a memory controller 2002 and to a system controller 2005 via a 64-bit processor bus 2027. Memory controller 2002 provides a 64-bit interface to memory 2003 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. A system controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and a bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to an IDE controller 2008, a SCSI Adapter 2018, a LAN Adapter 2019, and bridge and peripheral controller 2006). Certain of the local bus devices and components on local bus 2009 may optionally be provided as cards coupled to the local bus 2009 by a modular connector. In the embodiment of FIG. 6, IDE controller 2008, SCSI adapter 2018, and LAN adapter 2019 are provided as cards coupled to the local bus 2009 by a modular connector. Bridge and peripheral controller 2006 is directly connected to the local bus 2009. Alternate configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display adapter 2020 is shown coupled to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is coupled to two disks (hard disk 2011 and floppy disk 2012) and to a tape backup unit 2013. Alternative configurations may interface an IDE/ enhanced IDE CD-ROM via IDE controller 2008, although a both a CD-ROM 2015 and a CD jukebox 2017 are interfaced via SCSI adapter 2018 in the embodiment of FIG. 6. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is coupled to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 6. Additional SCSI devices may also be coupled to SCSI adapter 2018 and additional SCSI adapters may be coupled to local bus 2009 to provide even larger numbers of SCSI device connections. Additionally, SCSI adapter 2018 and/or additional SCSI adapters may be coupled to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 6, additional hard disks, printers, LAN adapters, and other computer systems may be coupled to processor 1040 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is coupled to local bus 2009 and, in the embodiment of FIG. 6, provides support for an IEEE 802.3 Carrier Sense Multiple Access with Collision Detection (CSMA/CD) local area network, although adapters for alternative network configurations and for media variations of an 802.3 network are also be suitable. LAN adapter 2019 is therefore representative of suitable alternative device adapters such as those based on IEEE 802.x standards (e.g., 802.3 baseband ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 coupled to processor 1040 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is coupled to any of the suitable bus structures (e.g., VL bus, PCI bus, ISA bus, SCSI, etc.).

ISA bus 2010 is coupled to local bus 2009 via bridge and peripheral controller 2006. Suitable bridges, like system controller 2005, are well known in the art, and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction I/O card such as super I/O 2028. Display adapters such as display adapter 2020 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 2020 is shown coupled to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super I/O 2028 is of any such suitable design. Modems may be coupled via serial port 2022 and printers may be coupled via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the communicating Applications Specification (CAS) and the more comprehensive Signal Computing System Architecture (SCSA) standard. Telephony card 2026 is of any such suitable design.

Preferably, a high performance server configuration, such as that shown in FIG. 6, includes a hierarchy of busses with varying performance characteristics each matched to the devices and components coupled thereto. Those skilled in the art will recognize a variety of suitable variations on the bus hierarchy of FIG. 6, including the elimination individual busses, the addition of multiple instances of individual busses, and redistribution of devices and components among the various busses. The server configuration of FIG. 6 is representative of all such suitable variations.

A multimedia workstation configuration for processor 1040 shown in FIG. 7. As with the server configuration of FIG. 6, the multimedia workstation configuration includes a hierarchy of busses with varying performance characteristics each matched to the devices and components coupled thereto. Those skilled in the art will recognize a variety of suitable variations on the bus hierarchy of FIG. 7. A memory bus 3002 couples processor 1040, a cache 3001, a memory 3003, and a bridge 3004. As with the network server configuration of FIG. 6, a variety of cache configurations are suitable for a multimedia workstation. A cache 3001 including control logic is coupled to processor 1040 via memory bus 3002. Alternate embodiments of processor 1040, may incorporate functionality of the control logic for cache 3001, thereby enabling a direct connection to the storage of cache 3001. Suitable modifications to the cache configuration of FIG. 7 (such as providing a cache in processor 1040) will be apparent to those skilled in the art.

An I/0 bus 3005 is comparable to local bus 2009 of FIG. 6 and is preferably a high speed I/O bus such as a VL bus or PCI bus. A SCSI adapter 3006, a LAN adapter expansion bus bridge 3008, a graphics adapter 3009, a sound adapter 3024, and a motion video adapter 3021 are coupled to each other and to processor 1040 via I/O bus 3005. SCSI adapter 3006, LAN adapter 3007, and expansion bus bridge 3008, together with the components and devices coupled to each are comparable to corresponding adapters, components, and devices discussed above with reference to FIG. 6.

In particular, SCSI adapter 3006 is coupled to multiple SCSI devices (illustratively, a disk 3011, a tape backup unit 3012, and a CD-ROM 3013) in a daisy chain configuration. For illustrative purposes, the daisy chain of SCSI devices is shown as a bus. Additional SCSI devices may also be coupled to SCSI adapter 3006. Suitable designs for SCSI adapter 3006 are discussed above with reference to the comparable SCSI adapter 2018 of FIG. 6. Variations on the set of SCSI devices, and on SCSI configurations in general (each of which has been described above with reference to FIG. 6) are also applicable in the multimedia workstation configuration of FIG. 7. Similarly, suitable designs and variations on LAN adapter 3007 are also described above in the context of the comparable LAN adapter 2019 (see FIG. 6). Furthermore, suitable designs and variations on expansion bus 3017 are described above in the context of the comparable ISA bus 2010 (see FIG. 6). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices coupled thereto) are comparable. SCSI adapter 3006, LAN adapter 3007, expansion bus bridge 3008, and expansion bus 3017 are therefore also of any such suitable designs.

Referring to FIG. 7, multimedia adapters, such as a sound adapter 3024, a motion video adapter 3021, and a graphics adapter 3009, are each coupled to processor 1040 via I/O bus 3005 and memory bus 3002 to provide for high-bandwidth transfers of multimedia data between the multimedia adapters, memory 3003, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively coupled to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from a video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration of FIG. 7, video compression and decompression can be performed by processor 1040 and/or by motion video adapter 3021. Thus, memory bus 3002 and bridge 3004 preferably support burst data transfers across the bridge (3004) between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 videoconferencing). Suitable designs for implementing such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 3009 is of any such suitable design. Alternative embodiments may combine the graphics display functionality of graphics adapter 3009 with the motion video display functionality of motion video adapter 3021 outputting on a single high-resolution display device.

CONCLUSION

While the above is a description of a specific embodiment of the invention, various alternatives, modifications, and equivalents may be used. For example, as discussed above, in alternate embodiments the descriptor cache could be a set-associative cache. Furthermore, variations in the dimensions of the descriptor and physical address caches are within the scope of the invention. For example, the number of entries stored in each of the above descriptor caches could be increased to 32, in which case bits 7:3 of a descriptor's physical address would be formed by adder 105 and used to address descriptor cache 106. Therefore, the above description should not be taken a limiting the scope of the invention which is defined by the appended claims.

What is claimed is:

1. In a microprocessor memory management system, a segment of a memory being specified by a segment descriptor, the segment descriptor being stored at a first physical address in a descriptor table held in the memory, a method of loading the segment descriptor into a segment descriptor register in response to a segment selector load instruction specifying a selector, the method comprising:

forming a first part of the first physical address;

searching for the segment descriptor in a part of a descriptor cache, the descriptor cache including a plurality of entries, the part of the descriptor cache including one or more of the entries and being addressed by the first part of the first physical address; and after the step of searching fails to find the segment descriptor in the descriptor cache, loading a second part of the first physical address into a first entry of a physical address cache, the physical address cache including a plurality of entries.

2. The method of claim 1, further comprising:

after the segment descriptor is found in the descriptor cache during the step of searching, loading the segment descriptor from the descriptor cache into the segment descriptor register.

3. The method of claim 1, further comprising:

after the step of searching fails to find the segment descriptor in the descriptor cache, loading the segment descriptor from the segment descriptor table into the segment descriptor register and into a first entry of the part of the descriptor cache.

4. The method of claim 1, wherein the descriptor cache is direct-mapped.

5. The method of claim 1, wherein the descriptor cache is set-associative.

6. The method of claim 3 wherein each entry of the physical address cache corresponds to a respective one of the entries of the descriptor cache, the first entry of the physical address cache corresponding to the first entry of the descriptor cache.

7. The method of claim 6, further comprising the steps of:
after the segment selector load instruction has executed, writing into the memory at the first physical address;
supplying the physical address cache with a signal indicating that the memory has been written at the first physical address;
determining, in response to the signal, if an entry in a part of the physical address cache matches the second part of the first physical address, the part of the physical address cache being addressed by the first part of the first physical address and including the first entry of the physical address cache; and
after determining that the first entry of the physical address cache matches the second part of the first physical address, modifying the first entry of the descriptor cache to indicate that the first entry of the descriptor cache is invalid.

8. The method of claim 6, wherein both the descriptor cache and the physical address cache are direct-mapped.

9. The method of claim 6, wherein both the descriptor cache and the physical address cache are set-associative.

10. The method of claim 1, wherein forming a first part of the first physical address comprises adding a part of an intermediate address of the descriptor table to a part of the selector.

11. In a microprocessor memory management system, a segment of the memory being specified by a segment descriptor, the segment descriptor being stored at a first physical address in a segment descriptor table held in the memory, a method of loading the segment descriptor, from the memory or from a descriptor cache, into a segment descriptor register in response to a segment selector load instruction, and of maintaining coherence between the memory and the descriptor cache, the method comprising:
searching for the segment descriptor in the descriptor cache, the descriptor cache including a plurality of entries;
after the step of searching fails to find the segment descriptor in the descriptor cache, loading the segment descriptor from the segment descriptor table into the segment descriptor register and into a first entry of the descriptor cache;
after the step of searching fails to find the segment descriptor in the descriptor cache, loading a part of the first physical address into a first entry of a physical address cache, the physical address cache including a plurality of entries, each entry of the physical address cache corresponding to a respective one of the entries of the descriptor cache, the first entry of the physical address cache corresponding to the first entry of the descriptor cache;
after the segment selector load instruction has executed, writing into the memory at the first physical address;
supplying the physical address cache with a signal indicating that the memory has been written at the first physical address;
determining, in response to the signal, if an entry of the physical address cache matches the part of the first physical address; and
after determining that the first entry of the physical address cache matches the part of the first physical address, modifying the first entry of the descriptor cache to indicate that the first entry of the descriptor cache is invalid.

12. In a microprocessor memory management system, a segment of the memory being specified by a segment descriptor, the segment descriptor being stored in a segment descriptor table held in the memory, a method of loading the segment descriptor into a segment descriptor register in response to a segment selector load instruction executing at a privilege level, the method comprising:
searching for the segment descriptor in a descriptor cache;
after the step of searching fails to find the segment descriptor in the descriptor cache, loading the segment descriptor from the segment descriptor table into the segment descriptor register and into the descriptor cache; and
after the step of searching fails to find the segment descriptor in the descriptor cache, storing the privilege level at which the selector load instruction is executing into the descriptor cache.

13. In a microprocessor memory management system, a segment of the memory being specified by a segment descriptor, a method of loading the segment descriptor into a segment descriptor register in response to a first segment selector load instruction having a first type and executing at a first privilege level, the method comprising:
searching for the segment descriptor in a descriptor cache, the descriptor cache including a plurality of entries, each entry being capable of storing, in response to a respective selector load instruction, a respective segment descriptor, a respective privilege level at which the respective selector load instruction was executing, and a respective type of the respective selector load instruction; and
after the segment descriptor is found in a particular entry of the descriptor cache during the step of searching, loading the segment descriptor from the descriptor cache into the segment descriptor register only if the type stored in the particular entry is the first type and either a first condition or a second condition is satisfied, the first condition being that the first privilege level equals the privilege level stored in the particular entry, the second condition being that the first privilege level is less than the privilege level stored in the particular entry and the first type is data segment load.

14. An apparatus for loading a segment descriptor specifying a segment of a memory into a segment descriptor register in response to a segment selector load instruction specifying a selector, the segment descriptor being stored at a first physical address in a descriptor table held in the memory, the apparatus comprising:
means for forming a first part of the first physical address;
a descriptor cache, the descriptor cache including a plurality of entries, a part of the descriptor cache including one or more of the entries and being addressed by the first part of the first physical address;
means for loading the segment descriptor from the descriptor cache into the segment descriptor register if the segment descriptor is found in the part of the descriptor cache;
means for loading the segment descriptor from the segment descriptor table into the segment descriptor register and into a first entry of the part of the descriptor cache if the segment descriptor is not found in the part of the descriptor cache; and a physical address cache including a plurality of entries, each entry of the physical address cache corresponding to a respective one of the entries of the descriptor cache.

15. The apparatus of claim 14, wherein the descriptor cache is direct-mapped.

16. The apparatus of claim 14, wherein the descriptor cache is set-associative.

17. The apparatus of claim 14, further comprising means for loading a second part of the first physical address into a first entry of the physical address cache if the segment descriptor is not found in the part of the descriptor cache, the first entry of the physical address cache corresponding to the first entry of the descriptor cache.

18. The apparatus of claim 17, wherein both the descriptor cache and the physical address cache are direct-mapped.

19. The apparatus of claim 17, wherein both the descriptor cache and the physical address cache are set-associative.

20. The apparatus of claim 17, further comprising:

means for supplying, in response to a write to the memory at the first physical address occurring after the selector load instruction has executed, the physical address cache with a signal indicating that the memory has been written at the first physical address;

means for determining if an entry in a part of the physical address cache matches the second part of the first physical address, the part of the physical address cache being addressed by the first part of the first physical address and including the first entry of the physical address cache; and means for modifying the first entry of the descriptor cache to indicate that the first entry of the descriptor cache is invalid after determining that the first entry of the physical address cache matches the second part of the first physical address.

21. The apparatus of claim 14, wherein the means for forming a first part of the first physical address comprises:

a first register for storing a part of the selector;

a second register for storing a part of an intermediate address of the descriptor table; and an adder, coupled to the first and second registers, for forming the sum of the part of the selector and the part of the intermediate address of the descriptor table, thereby obtaining the first part of the first physical address.

22. An apparatus for loading a segment descriptor specifying a segment of a memory, from the memory or a descriptor cache, into a segment descriptor register in response to a segment selector load instruction specifying a selector, and for maintaining coherence between the memory and the descriptor cache, the segment descriptor being stored in the memory at a first physical address, the apparatus comprising:

the descriptor cache, the descriptor cache including a plurality of entries;

means for loading the segment descriptor from the memory into the segment descriptor register and into a first entry of the descriptor cache, if the segment descriptor is not present in the descriptor cache;

means for loading a part of the first physical address into a first entry of a physical address cache if the segment descriptor is not present in the descriptor cache, the physical address cache including a plurality of entries, each entry of the physical address cache corresponding to a respective one of the entries of the descriptor cache, the first entry of the physical address cache corresponding to the first entry of the descriptor cache;

means for supplying, in response to a write to the memory at the first physical address occurring after the selector load instruction has executed, the physical address cache with a signal indicating that the memory has been written at the first physical address;

means for determining, in response to the signal, if an entry of the physical address cache matches the part of the first physical address; and means for modifying the first entry of the descriptor cache to indicate that the first entry of the descriptor cache is invalid after determining that the first entry of the physical address cache matches the part of the first physical address.

23. An apparatus for loading a segment descriptor specifying a segment of a memory into a segment descriptor register in response to a segment selector load instruction executing at a privilege level, the segment descriptor being stored in a descriptor table held in the memory, the apparatus comprising:

a descriptor cache; and means for loading the segment descriptor from the segment descriptor table into the segment descriptor register and into the descriptor cache and for storing the privilege level at which the selector load instruction is executing into the descriptor cache, if the segment descriptor is not present in the descriptor cache.

24. An apparatus for loading a segment descriptor specifying a segment of a memory into a segment descriptor register in response to a segment selector load instruction having a first type and executing at a first privilege level, the apparatus comprising:

a descriptor cache including a plurality of entries, each entry being capable of storing, in response to a respective selector load instruction, a respective segment descriptor, a respective privilege level at which the respective selector load instruction was executing and a respective type of the respective selector load instruction; and means for loading the segment descriptor from the descriptor cache into the segment descriptor register only if the segment descriptor is present in a particular entry of the descriptor cache and the type stored in the particular entry is the first type and either a first condition or a second condition is satisfied, the first condition being that the first privilege level equals the privilege level stored in the particular entry, the second condition being that the first privilege level is less than the privilege level stored in the particular entry and the first type is data segment load.

* * * * *